United States Patent
Kanna et al.

(10) Patent No.: US 9,266,705 B2
(45) Date of Patent: Feb. 23, 2016

(54) BATTERY FORKLIFT (71) Applicant: KABUSHIKI KAISHA TOYOTA JIDOSHOKKI, Kariya-shi, Aichi-ken (JP)

(72) Inventors: Takanori Kanna, Kariya (JP); Munenori Onitsuka, Kariya (JP); Kyohei Toda, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/378,724

(22) PCT Filed: Mar. 19, 2013

(86) PCT No.: PCT/JP2013/057847
§ 371 (c)(1),
(2) Date: Aug. 14, 2014

(87) PCT Pub. No.: WO2013/150893
PCT Pub. Date: Oct. 10, 2013

(65) Prior Publication Data
US 2015/0014085 A1 Jan. 15, 2015

(30) Foreign Application Priority Data
Apr. 3, 2012 (JP) ................................ 2012-084907

(51) Int. Cl.
*F16H 57/04* (2010.01)
*F16H 57/021* (2012.01)
(Continued)

(52) U.S. Cl.
CPC .............. *B66F 9/07572* (2013.01); *B60K 7/00* (2013.01); *B60K 7/0007* (2013.01);
(Continued)

(58) Field of Classification Search
CPC ........ B66F 9/072; B66F 9/07; B66F 9/07572; B66F 9/07586; B60L 2220/46; F16H 57/0457; B60K 7/0007; B60Y 2200/15
USPC .......................................... 180/346, 252, 339
See application file for complete search history.

(56) References Cited

U.S. PATENT DOCUMENTS 7,588,113 B2 * 9/2009 Scharfenberg ................ 180/253
2003/0155163 A1 * 8/2003 Sugata et al. ................. 180/199

FOREIGN PATENT DOCUMENTS

JP  57-109360 U  7/1982
JP  60-84857 U   6/1985
(Continued)

OTHER PUBLICATIONS

Communication dated Oct. 7, 2014, issued by the International Searching Authority in counterpart International Application No. PCT/JP2013057847.

(Continued)

*Primary Examiner* — Keith Frisby
(74) *Attorney, Agent, or Firm* — Sughrue Mion, PLLC (57) ABSTRACT

A battery forklift includes a battery and a motor that includes a rotation shaft and is driven using the battery as a power source. A reduction device reduces the speed of rotation of the rotation shaft and transmits the rotation to an axle. A case accommodates the reduction device. A drive wheel is driven by rotation of the axle. The reduction device includes a helical gear rotated integrally with the rotation shaft and a drive shaft formed integrally with the helical gear and extended in a vertical direction. The reduction device further includes an upper bearing located above the helical gear to support the drive shaft rotatably relative to the case and a lower bearing located below the helical gear to support the drive shaft rotatably relative to the case. The case includes a communication portion that communicates a lower void located below the upper bearing and an upper void located above the upper bearing.

9 Claims, 5 Drawing Sheets (51) Int. Cl.
*B66F 9/075* (2006.01)
*B66F 9/07* (2006.01)
*B60L 11/18* (2006.01)
*F16H 1/20* (2006.01)
*B60K 7/00* (2006.01)
*B60K 17/04* (2006.01)

(52) U.S. Cl.
CPC .............. *B60K 17/043* (2013.01); *B60L 11/18* (2013.01); *B66F 9/072* (2013.01); *F16H 1/203* (2013.01); *F16H 57/0424* (2013.01); *F16H 57/0471* (2013.01); *F16H 57/0495* (2013.01); *B60K 2007/0038* (2013.01); *B60K 2007/0084* (2013.01); *B60Y 2200/15* (2013.01); *B60Y 2200/62* (2013.01)

(56) References Cited

FOREIGN PATENT DOCUMENTS

| | | |
|---|---|---|
| JP | 62-96157 U | 6/1987 |
| JP | 62-150495 U | 9/1987 |
| JP | 4-93202 U | 8/1992 |
| JP | 2007-210588 A | 8/2007 |
| JP | 2007-308068 A | 11/2007 |
| JP | 2010-169170 A | 8/2010 |

OTHER PUBLICATIONS

International Search Report of PCT/JP2013/057847 dated Jun. 11, 2013 [PCT/ISA/210].

* cited by examiner

BATTERY FORKLIFT

CROSS REFERENCE TO RELATED APPLICATIONS

This is a National Stage of International Application No. PCT/JP2013/057847 filed Mar. 19, 2013, claiming priority based on Japanese Patent Application No. 2012-084907 filed Apr. 3, 2012, the contents of all of which are incorporated herein by reference in their entirety.

FIELD OF THE INVENTION

The present invention relates to a battery forklift that includes a reduction mechanism, which reduces the rotation speed of a rotation shaft of a motor and transmits the rotation to an axle to drive wheels.

BACKGROUND OF THE INVENTION

In such a battery forklift, it is important that the leakage of lubricating oil from a case that accommodates the reduction device be prevented. Patent document 1 describes an example of a structure that prevents the leakage of lubricating oil from a case.

Patent document 1 describes a reduction device that includes a housing accommodating a differential mechanism, which includes a drive pinion. The housing includes a differential carrier and a rear cover. The differential carrier includes a rotation support that rotatably supports the drive pinion. The drive pinion engages with and rotates a bevel gear that is partially immersed in lubricating oil in an oil reservoir formed in the housing. A restriction plate is arranged above the oil reservoir to limit excessive supply of lubricating oil. The restriction plate limits the amount of lubricating oil that is supplied to the rotation support when the bevel gear rotates. This prevents the leakage of lubricating oil from a gap formed between the rotation support and the housing.

PRIOR ART DOCUMENT

Patent Document

Patent Document 1: Japanese Unexamined Utility Model Publication No. 4-93202

SUMMARY OF THE INVENTION

The reduction device of patent document 1 includes the restriction plate that limits the leakage of lubricating oil from the case. However, the use of such a restriction plate increases the number of components.

Although various structures have been proposed to prevent the leakage of lubricating oil from a case without increasing the number of components, other problems such as enlargement of the reduction device arise in such structures. In this respect, there is a need for further improvements.

It is an object of the present invention to provide an improved battery forklift capable of preventing the leakage of lubricating oil from a case of a reduction mechanism in a preferable manner.

According to one aspect of the present invention, a battery forklift includes a battery and a motor that includes a rotation shaft and is driven using the battery as a power source. A reduction device reduces the speed of rotation of the rotation shaft and transmits the rotation to an axle. A case accommodates the reduction device. A drive wheel is driven by rotation of the axle. The reduction device includes a helical gear rotated integrally with the rotation shaft and a drive shaft formed integrally with the helical gear and extended in a vertical direction. The reduction device further includes an upper bearing located above the helical gear to support the drive shaft rotatably relative to the case and a lower bearing located below the helical gear to support the drive shaft rotatably relative to the case. The case includes a communication portion that communicates a lower void located below the upper bearing and an upper void located above the upper bearing.

When the battery forklift is driven and the lubricating oil is moved by the pumping effect of the helical gear and leaks into the upper void through the gap between the case and the upper bearing, the leakage of the lubricating oil is returned to the lower void through the communication portion. As a result, the lubricating oil sent to the upper void by the pumping effect of the helical gear does not collect in the upper void. This prevents leakage of lubricating oil from the case of the reduction device. Accordingly, the leakage of lubricating oil from the case 42 is prevented without the need for space between the upper bearing and the helical gear, that is, without enlarging the reduction device. Moreover, the formation of the communication portion in the case prevents leakage of lubricating oil from the case without increasing the number of components.

DETAILED DESCRIPTION OF THE INVENTION

Referring to FIGS. 1 to 4, one embodiment of a battery forklift, which is a reach forklift (hereinafter referred to as forklift), will now be described. In the following description, the terms "front", "rear", "left", "right", "up", and "down" use a frame of reference taken as viewed from a forklift driver facing toward the front of the forklift (advancing direction). The terms "up" and "down" using the frame of reference taken as viewed from the forklift driver facing toward the front of the forklift conform to "up" and "down" in the vertical direction, respectively.

Figure 1:
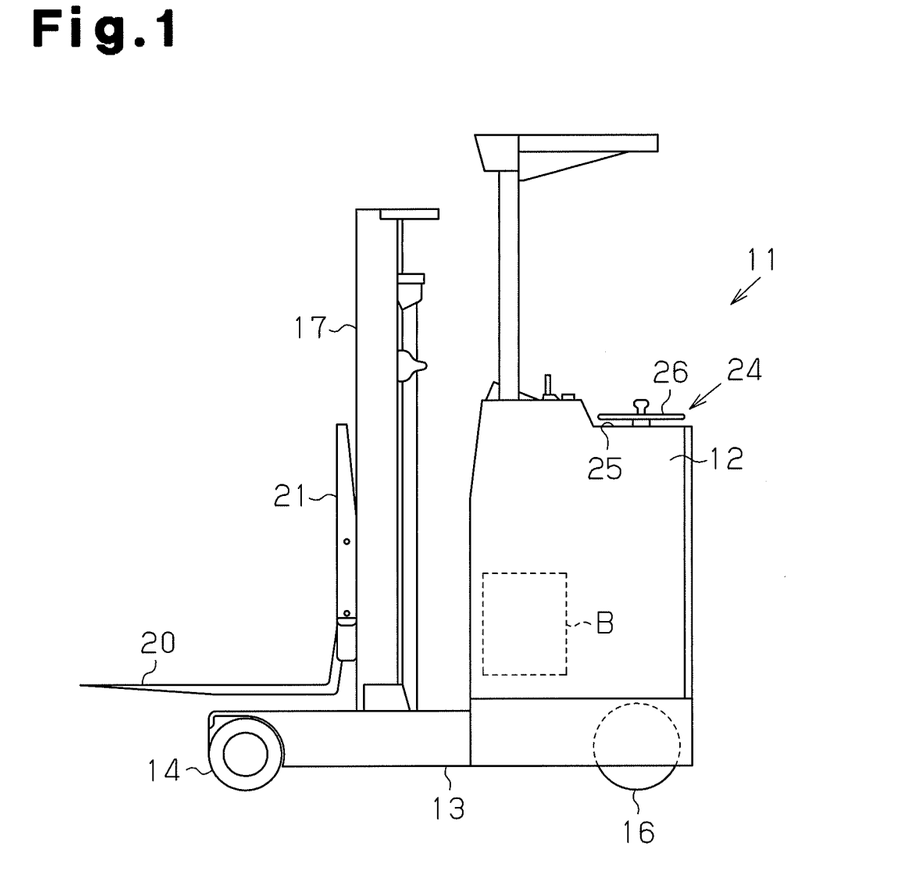
FIG. 1 is a side view showing a reach forklift according to one embodiment of the present invention.

As shown in FIG. 1, a forklift 11 includes a vehicle body 12 and right and left reach legs 13 extending forward from the vehicle body 12. A front wheel 14 is arranged at the front end of each reach leg 13. Rear wheels 16, which serve as drive wheels, and caster wheels (not shown) are arranged at the rear side of the vehicle body 12. A mast 17 is arranged in front of the vehicle body 12. The mast 17 is driven by a reach cylinder (not shown) to move back and forth along the reach legs 13. A lift bracket 21 and right and left forks 20 supported by the lift bracket 21 are arranged on the front side of the mast 17. The forks 20 are lifted and lowered along the mast 17. Further, a standing type operator cab 24 is located in the rear section of the vehicle body 12. The operator cab 24 includes a steering table 25 with a steering wheel 26 used to operate the rear wheels 16. In addition, the forklift 11 includes a battery B.

Figure 2:
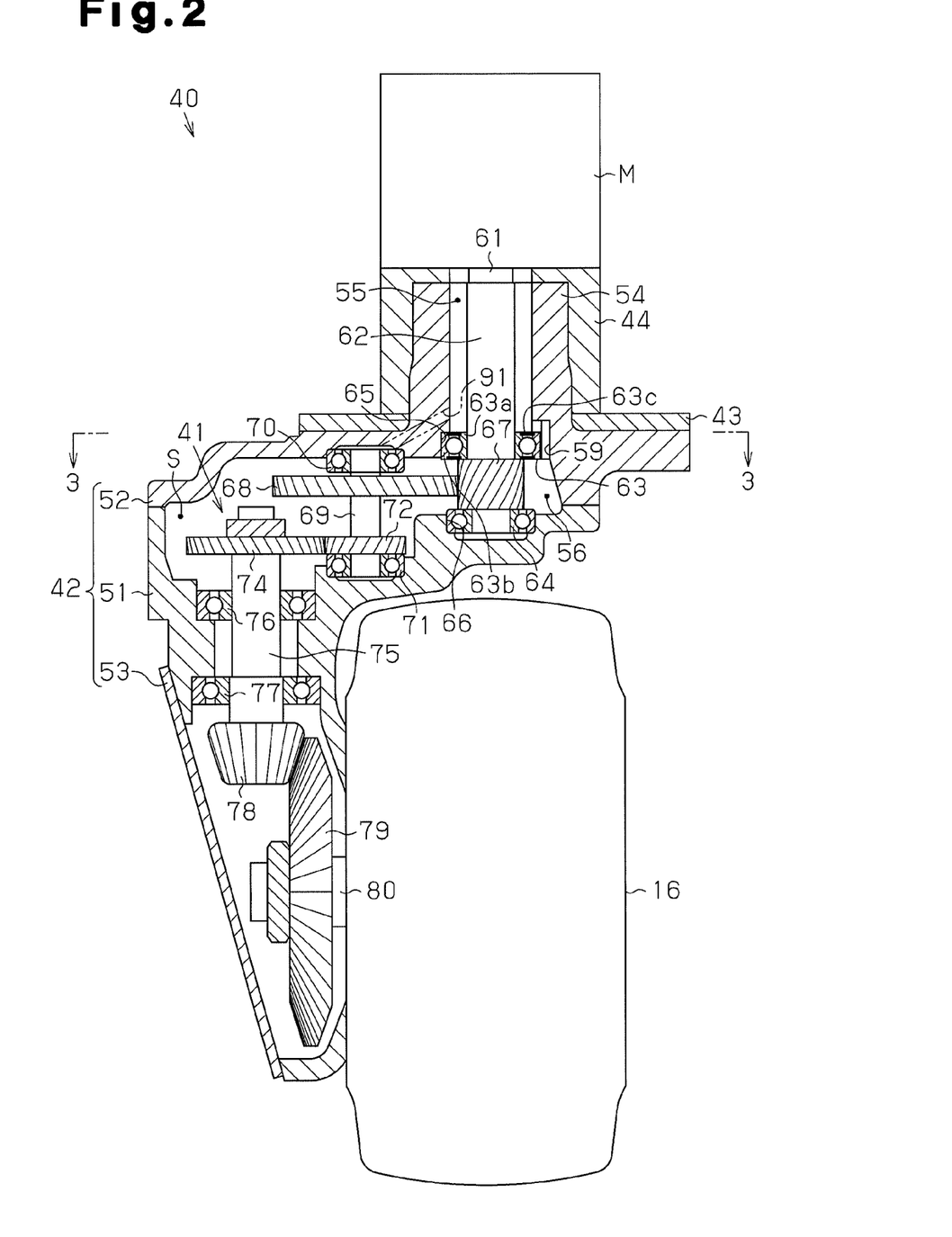
FIG. 2 is a schematic cross-sectional view showing a drive unit of the forklift of FIG. 1.

As shown in FIG. 2, each rear wheel 16 is driven by a drive unit 40. The drive unit 40 includes a reduction device 41 including a case 42. The case 42 includes a tubular case body 51, an upper case cover 52, which is coupled to the upper section of the case body 51, and a lower case cover 53, which is coupled to the lower section of the case body 51. The case 42 includes an accommodation chamber S.

The upper case cover 52 includes a tubular projection 54 that includes a cavity 55. The cavity 55 is in communication with the accommodation chamber S.

A gear wheel 43 is fixed to the upper surface of the upper case cover 52. The gear wheel 43 allows the drive unit 40 to be driven in cooperation with the operation of the steering wheel 26. In addition, a support 44, which is arranged on the upper surface of the gear wheel 43, supports a motor M. The motor M is driven using a battery B as a power source. The motor M includes a rotation shaft 61 that is rotatable in forward and reverse directions.

The rotation shaft 61 of the motor M is coupled to a drive shaft 62 that rotates integrally with the rotation shaft 61. The drive shaft 62 is accommodated in the case 42 and extends in the vertical direction. The drive shaft 62 is supported by an upper bearing 63 and a lower bearing 64 to be rotatable relative to the case 42. The upper case cover 52 includes an upper recess 65 that receives the upper bearing 63. The upper recess 65 is formed in the inner circumferential surface of upper case cover 52 at the basal side of the projection 54. The case body 51 includes a lower recess 66 that receives the lower bearing 64. The lower recess 66 is arranged in a section opposing the upper recess 65 in the vertical direction. The upper bearing 63 includes an inner race 63a, an outer race 63b, and a seal member 63c that seals the space between the inner race 63a and the outer race 63b. The space between the inner race 63a and the outer race 63b is filled with lubricating oil.

A first helical gear 67 is arranged between the upper bearing 63 and the lower bearing 64 in the accommodation chamber S. The first helical gear 67 is formed integrally with the drive shaft 62. Thus, the drive shaft 62 is supported by the two bearings 63 and 64, which are arranged above and below the first helical gear 67, to be rotatable relative to the case 42. Since the drive shaft 62 rotates integrally with the rotation shaft 61, the first helical gear 67 rotates integrally with the rotation shaft 61. Further, the accommodation chamber S accommodates a second helical gear 68, which is a driven gear engaged with the first helical gear 67. The second helical gear 68 is fixed to and rotated integrally with a first support shaft 69. The first support shaft 69 is supported by upper and lower bearings 70 and 71 to be rotatable relative to the case 42. A third helical gear 72 is arranged below the second helical gear 68 and fixed to and rotated integrally with the first support shaft 69. Rotation of the first helical gear 67 integrally rotates the second helical gear 68, the third helical gear 72, and the first support shaft 69.

The accommodation chamber S also accommodates a fourth helical gear 74 that is engaged with the third helical gear 72. The fourth helical gear 74 is fixed to and rotated integrally with a second support shaft 75. The second support shaft 75 is supported by upper and lower bearings 76 and 77 to be rotatable relative to the case 42. A drive bevel gear 78 is fixed to the lower end of the second support shaft 75. Rotation of the third helical gear 72 integrally rotates the fourth helical gear 74 and the drive bevel gear 78.

The lower case cover 53 rotatably supports an axle 80 of the rear wheels 16. The axle 80 is integrated with a driven bevel gear 70 that is engaged with the drive bevel gear 78. The first helical gear 67, the second helical gear 68, the third helical gear 72, and the fourth helical gear 74 are all accommodated in the accommodation chamber S. The area in the accommodation chamber S excluding the cavity 55 forms a gear accommodation chamber 56. When the rotation shaft 61 of the motor M rotates, the first to fourth gears 67, 68, 72 and 74 transmit the rotation of the rotation shaft 61 to the axle 80 while reducing the rotation speed. This drives the rear wheels 16. In addition, the accommodation chamber S is filled with lubricating oil that lubricates the engaged parts of the gears 67, 68, 72, 74, 78 and 79 and the bearings 63, 64, 70, 71, 76 and 77.

Figure 5:
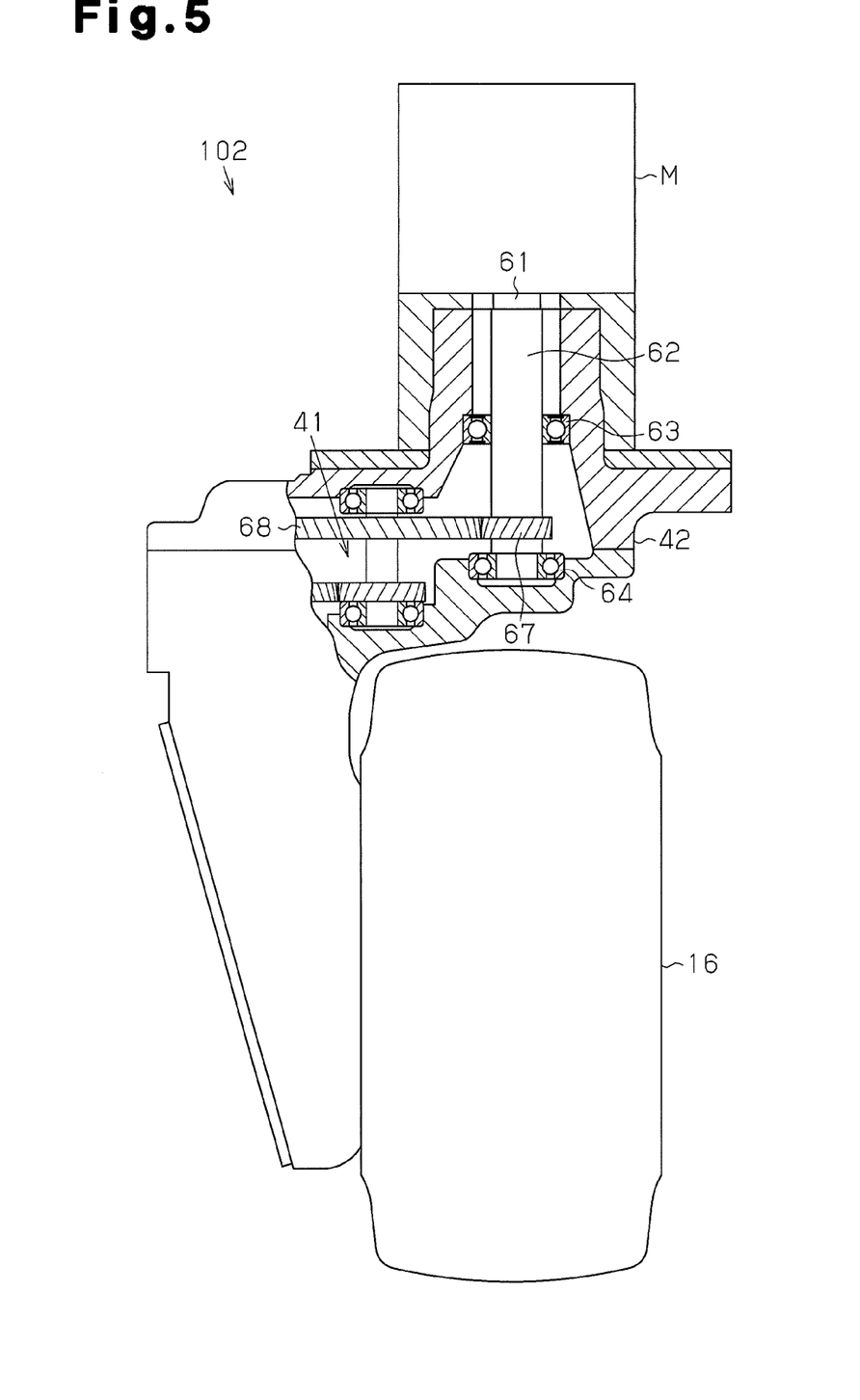
FIG. 5 is a partial cutaway view showing technology on which the drive unit of FIG. 2 is based.

Referring to FIG. 5, technology on which the present embodiment is based will now be described. In FIG. 5 that shows a drive unit 102, same reference numerals are given to those components that are the same as the corresponding components of the drive unit 40 shown in FIG. 2. In the drive unit 102, when the forklift is moved in reverse, the pumping effect of the first helical gear 67 moves lubricating oil upward in the vertical direction. In the drive unit 102 of FIG. 5, the upper bearing 63 is arranged above and spaced apart from the first helical gear 67 to create space between the first helical gear 67 and the upper bearing 63. The space prevents lubricating oil from reaching the upper bearing 63. Thus, even when lubricating oil is sent to the upper side of the helical gear 67, the lubricating oil does not reach the upper bearing 63. This prevents the lubricating oil from leaking through the gap between the upper bearing 63 and the case 42 into the cavity 55, which is located above the upper bearing 63. Consequently, the leakage of lubricating oil from the case 42 is prevented.

However, since the upper bearing 63 is arranged above and spaced apart from the first helical gear 67 to create space between the upper bearing 63 and the first helical gear 67, the distance between the upper bearing 63 and the lower bearing 64 is relatively long. This lowers the support rigidity of the drive shaft 62 and enlarges the reduction device 41 and, consequently, the drive unit 102.

Thus, to avoid enlargement of the drive unit 40, the present embodiment includes the following structures.

Figure 3A:
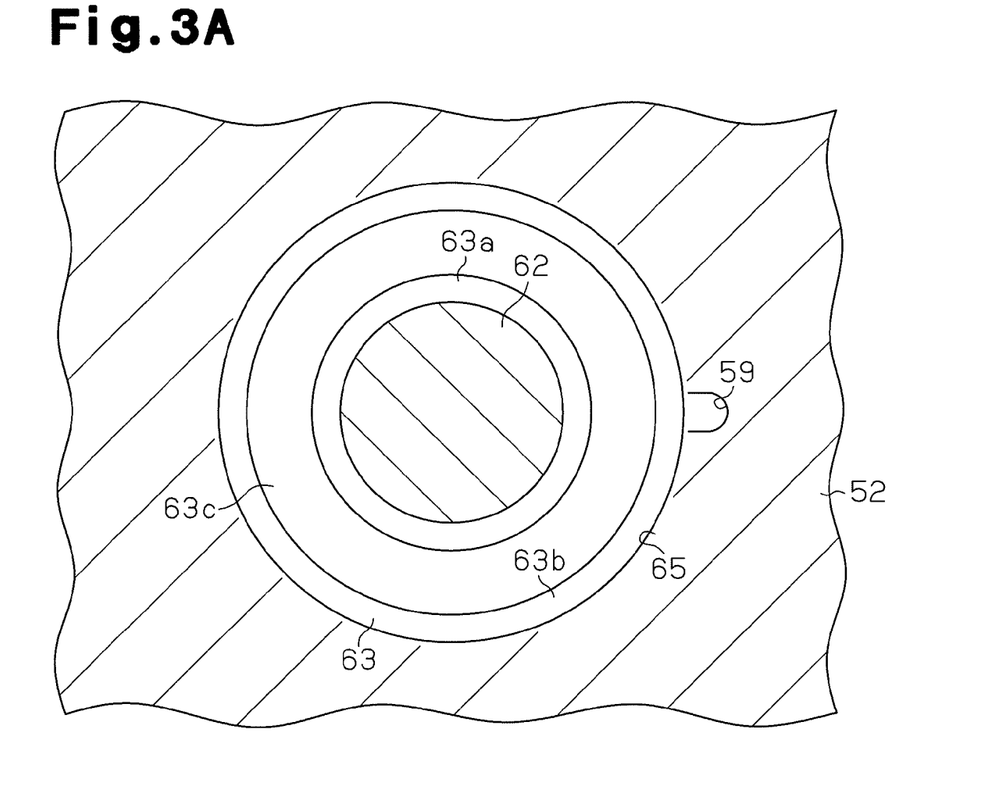
FIG. 3A is a cross-sectional view taken along line 3-3 in FIG. 2 and showing an upper bearing and a communication recess.
Figure 3B:
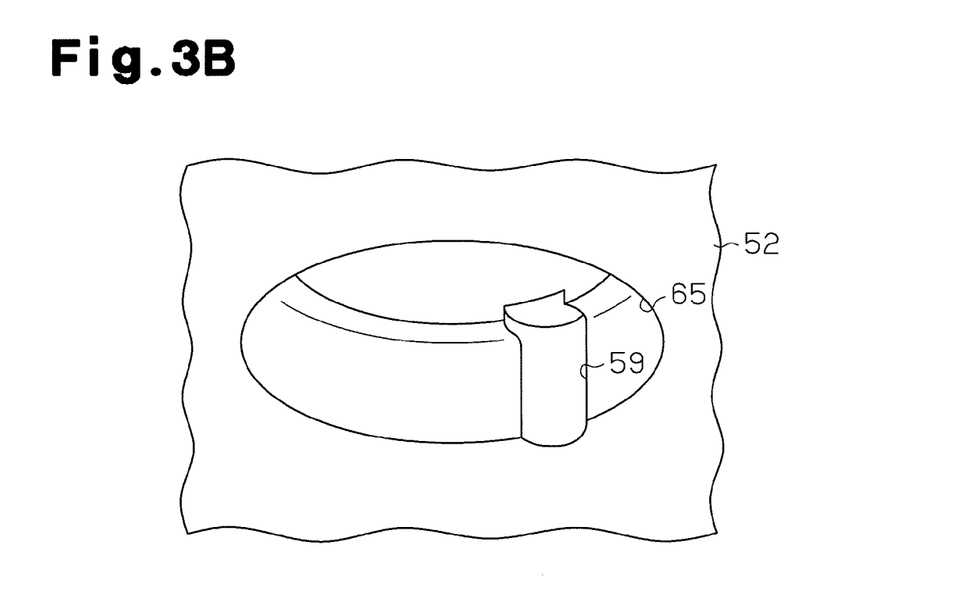
FIG. 3B is a perspective view showing the upper recess and the communication recess of FIG. 3A.

As shown in FIGS. 3A and 3B, the circumferential surface of the upper recess 65 includes a communication recess 59, which functions as a communication portion. The communication recess 59 extends continuously in the vertical direction from the lower end of the upper recess 65 to a position slightly above the upper end of the upper recess 65. The communication recess 59 has a cross-section perpendicular to the vertical direction having an arcuate shape.

As shown in FIG. 2, the communication recess 59 communicates the cavity 55 and the gear accommodation chamber 56, which are separated from each other by the upper bearing 63. In the present embodiment, the cavity 55 functions as an upper void that is located above the upper bearing 63, and the gear accommodation chamber 56 functions as a lower void that is located below the upper bearing 63.

Specifically, the communication recess 59 communicates the cavity 55 and a region in the gear accommodation chamber 56 that is located at the side of the first helical gear 67 opposite to the second helical gear 68. Consequently, the lubricating oil returned to the gear accommodation chamber 56 through the communication recess 59 is supplied to a region located at the side of the first helical gear 67 opposite to the second helical gear 68. Thus, the lower void may be considered to be the region in the gear accommodation chamber 56 that is located at the side of the first helical gear 67 opposite to the second helical gear 68. In other words, the communication recess 59 opens in the region that is located at the side of the first helical gear 67 opposite to the second helical gear 68.

The operation of the forklift 11 of the present embodiment will now be described.

Figure 4:
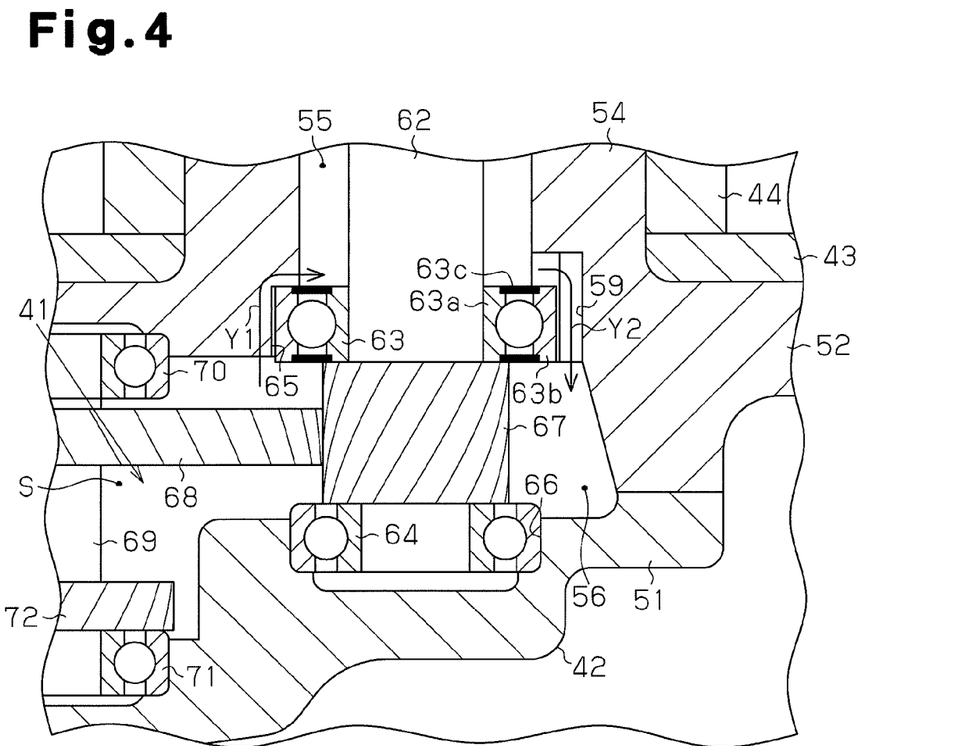
FIG. 4 is a diagram showing the operation of the forklift of FIG. 1.

As shown in FIG. 4, when the forklift 11 is driven (moved in reverse) and the drive shaft 62 and the first support shaft 69 rotate, the pumping effect of the third helical gear 72 moves lubricating oil to the upper side of the third helical gear 72. Then, the lubricating oil is further moved upward by the pumping effect of the first helical gear 67 and scattered at the upper side of the gear accommodation chamber 56. Some of the lubricating oil scattered to the upper side of the gear accommodation chamber 56 leaks into the cavity 55 through the narrow gap between the bearing 63 and the upper recess 65 (the wall surface of the case 42) as indicated by arrow Y1. The lubricating oil that leaks into the cavity 55 is returned to the gear accommodation chamber 56 through the communication recess 59 by its own weight.

The advantages of the present embodiment will now be described.

(1) The upper case cover 52 includes the communication recess 59 that communicates the cavity 55 and the gear accommodation chamber 56, which are located above and below the communication recess 59. Thus, even when lubricating oil leaks into the cavity 55 due to the pumping effect of the first helical gear 67, the leakage of the lubricating oil is returned to the gear accommodation chamber 56 through the communication recess 59 by its own weight. As a result, the lubricating oil sent to the cavity 55 by the pumping effect of the first helical gear 67 does not collect in the cavity 55. This prevents leakage of lubricating oil from the case 42. Accordingly, the leakage of lubricating oil from the case 42 is prevented without the need for space between the upper bearing 63 and the first helical gear 67, that is, without enlarging the reduction device 41. Thus, the present embodiment does not increase the distance between the upper bearing 63 and the lower bearing 64, lower the support rigidity of the drive shaft 62, or enlarge the drive unit 40. Moreover, the formation of the communication recess 59 in the case 42 prevents leakage of lubricating oil from the case 42 without increasing the number of components.

(2) The cross-section of the communication recess 59 perpendicular to the vertical direction has the shape of an arc. That is, the cross-section of the communication recess 59 perpendicular to the vertical direction is curved. If the cross-section of the communication recess 59 were to include a corner, stress would be concentrated at the corner. The curved cross-section inhibits the concentration of stress in one section. Thus, decreases are limited in the strength of the case 42 that may be caused by the formation of the communication recess 59.

(3) The lubricating oil returned to the gear accommodation chamber 56 through the communication recess 59 is delivered to the region located at the side of the first helical gear 67 opposite to the second helical gear 68. Thus, the lubricating oil returned to the gear accommodation chamber 56 from the cavity 55 is prevented from being immediately sent to the upper side of the gear accommodation chamber 56 by the pumping effect of the first helical gear 67. This reduces the amount of lubricating oil scattered to the upper side of the gear accommodation chamber 56 and, consequently, the amount of lubricating oil leaking to the cavity 55.

The above embodiment may be modified as described below.

The case 42 may include a communication hole that functions as a communication portion that communicates a region above a bearing and a region below the bearing. In this case, the cavity 55 may be in communication with a region where lubricating oil tends to become insufficient so that lubricating oil is supplied to that region. For example, as indicated by the double-dashed lines in FIG. 2, a communication hole 91 may communicate the cavity 55 and a region in the gear accommodation chamber 56 that is located above the bearing 70.

The communication portion may be arranged at any location as long as it communicates the region above the upper bearing 63 (hollow 55) and the region below the upper bearing 63 (gear accommodation chamber 56).

The shape of the communication recess may be modified. For example, the communication recess may have a cross-section that is polygonal like a tetragon or a pentagon.

In the present embodiment, lubricating oil leaks to the region above the upper bearing 63 (hollow 55) when driving the forklift 11 in reverse. However, depending on the directions of the teeth of helical gears 67, 68, 72 and 74, lubricating oil may leak to the region above the upper bearing 63 (hollow 55) when driving the forklift 11 forward. Nevertheless, the lubricating oil leaking to the region above the upper bearing 63 (hollow 55) is returned to the gear accommodation chamber 56 through the communication recess 59 by its own weight. Thus, the operation and advantages of the present embodiment are present in both backward driving and forward driving.

In addition to a battery forklift, the prevent invention may be embodied in an order picking truck, for example.

The invention claimed is:

1. A battery forklift comprising:
a battery;
a motor that includes a rotation shaft and is driven using the battery as a power source;
a reduction device that reduces the speed of rotation of the rotation shaft and transmits the rotation to an axle;
a case that accommodates the reduction device; and
a drive wheel that is driven by rotation of the axle, wherein the reduction device includes
a helical gear rotated integrally with the rotation shaft,
a drive shaft formed integrally with the helical gear and extended in a vertical direction,
an upper bearing located above the helical gear to support the drive shaft rotatably relative to the case, and
a lower bearing located below the helical gear to support the drive shaft rotatably relative to the case, and
the case includes a communication portion that communicates a lower void located below the upper bearing and an upper void located above the upper bearing.

2. The battery forklift according to claim 1, wherein the communication portion includes a cross-section extending perpendicular to the vertical direction and having a curved shape.

3. The battery forklift according to claim 2, wherein the communication portion includes a cross-section extending perpendicular to the vertical direction and having an arcuate shape.

4. The battery forklift according to claim 1, wherein
the case includes an inner circumferential surface for accommodating the upper bearing, and
the communication portion includes a communication recess recessed inward from the inner circumferential surface.

5. The battery forklift according to claim 1, wherein
the helical gear is a first helical gear,
the reduction device further includes a second helical gear which is a driven gear engaged with the first helical gear in the case, and
the lower void is located at a side of the first helical gear opposite to the second helical gear.

6. The battery forklift according to claim 1, wherein
the helical gear is a first helical gear,
the reduction device further includes a second helical gear which is a driven gear engaged with the first helical gear in the case, and
the communication portion opens toward a region in the lower void located at a side of the first helical gear opposite to the second helical gear.

7. The battery forklift according to claim 1, wherein the case includes a tubular projection for accommodating the drive shaft in the vertical direction, and the upper bearing is located at a basal end of the tubular projection of the case.

8. The battery forklift according to claim 1, wherein the communication portion includes a communication hole formed in the case that has a first end that opens in the lower void and a second end that opens in the upper void.

9. The battery forklift according to claim 8, wherein
the helical gear is a first helical gear,
the reduction device further includes a second helical gear which is a driven gear engaged with the first helical gear in the case, and
the first end of the communication hole opens in a region above an upper bearing of the second helical gear.

\* \* \* \* \*